United States Patent
Balasubramanian et al.

(10) Patent No.: US 10,210,511 B2
(45) Date of Patent: Feb. 19, 2019

(54) SYSTEM AND METHOD FOR CONVERSION BETWEEN INTERNET AND NON-INTERNET BASED TRANSACTIONS

(71) Applicant: CardinalCommerce Corporation, Mentor, OH (US)

(72) Inventors: Chandra Balasubramanian, University Heights, OH (US); Francis Sherwin, Shaker Heights, OH (US); Michael A. Keresman, III, Kirtland Hills, OH (US)

(73) Assignee: CardinalCommerce Corporation, Mentor, OH (US)

( * ) Notice: Subject to any disclaimer, the term of this patent is extended or adjusted under 35 U.S.C. 154(b) by 845 days.

(21) Appl. No.: 14/472,874

(22) Filed: Aug. 29, 2014

(65) Prior Publication Data

US 2014/0372323 A1    Dec. 18, 2014

Related U.S. Application Data

(63) Continuation of application No. 11/340,887, filed on Jan. 27, 2006, now Pat. No. 8,825,556.
(Continued)

(51) Int. Cl.
*G06Q 20/38*    (2012.01)
*G06Q 20/04*    (2012.01)
(Continued)

(52) U.S. Cl.
CPC ......... *G06Q 20/3821* (2013.01); *G06Q 20/04* (2013.01); *G06Q 20/382* (2013.01);
(Continued)

(58) Field of Classification Search
CPC .. G06Q 20/3821; G06Q 20/04; G06Q 20/382; G06Q 20/385; G06Q 20/40;
(Continued)

(56) References Cited

U.S. PATENT DOCUMENTS 5,657,390 A  *  8/1997  Elgamal .................. H04L 29/06
                                                       713/151
6,594,376 B2 *  7/2003  Hoffman .............. G06K 9/6255
                                                       382/115
(Continued)

FOREIGN PATENT DOCUMENTS

CA          2528451        1/2005
JP        2002-63520       2/2002
(Continued)

OTHER PUBLICATIONS (ETSI TS 133 120 V3.0.0 (Jan. 2000), Universal Mobile Telecommunications System (UMTS); 3G Security; Security Principles and Objectives (3G TS 33.120 version 3.0.0 Release 1999, 11 pages) (Year: 2000).*
(Continued)

*Primary Examiner* — James D Nigh
(74) *Attorney, Agent, or Firm* — The Webb Law Firm

(57)    ABSTRACT

A method is provided for completing an authenticated commercial transaction over an internet protocol (IP) network (40) for an account holder (60) engaged in the transaction via a non-IP based telecommunications platform (30). The method includes: receiving a first message from the account holder (60) via the non-IP based telecommunications platform (30), the first message triggering authentication of the account holder (60) and being in a first communication format; establishing account information for a payment instrument being used in the transaction based upon content in the first message; generating a second message using a second communication format different from the first format, the second message including the established account information; submitting the second message via the IP network (40) to a network entity (110, 200) such that an authentication document is generated (120), the authentication document (120) containing an input field
(Continued)

(122); generating a third message using the first format, the third message being submitted to the account holder (60) via the non-IP based telecommunications platform (30) such that the account holder (60) is prompted to enter a security code; receiving a fourth message containing the entered security code from the account holder (60) via the non-IP based telecommunications platform (30), the fourth message being in the first format; and, accessing the authentication document (120) via the IP network (40) to fill-in the input field (122) of the authentication document (120) with the security code contained in the fourth message.

16 Claims, 4 Drawing Sheets

Related U.S. Application Data

(60) Provisional application No. 60/647,883, filed on Jan. 28, 2005.

(51) Int. Cl.
- G06Q 20/40 (2012.01)
- G06Q 20/42 (2012.01)
- G06Q 30/02 (2012.01)
- G06Q 30/06 (2012.01)
- G06Q 20/32 (2012.01)

(52) U.S. Cl.
CPC .......... *G06Q 20/385* (2013.01); *G06Q 20/40* (2013.01); *G06Q 20/403* (2013.01); *G06Q 20/425* (2013.01); *G06Q 30/02* (2013.01); *G06Q 30/06* (2013.01); *G06Q 20/32* (2013.01); *G06Q 20/3823* (2013.01)

(58) Field of Classification Search
CPC .... G06Q 20/403; G06Q 20/425; G06Q 30/02; G06Q 30/06; G06Q 20/32; G06Q 20/3823
USPC ......................................................... 705/64
See application file for complete search history.

(56) References Cited

U.S. PATENT DOCUMENTS

| | | | | |
|---|---|---|---|---|
| 6,636,969 | B1 * | 10/2003 | Jakobsson | G06Q 20/06 705/69 |
| 6,782,100 | B1 * | 8/2004 | Vanstone | G06F 7/725 380/259 |
| 7,024,174 | B2 | 4/2006 | Nagy et al. | |
| 7,181,017 | B1 * | 2/2007 | Nagel | H04L 9/0825 380/282 |
| 7,188,110 | B1 * | 3/2007 | Ludtke | G06Q 20/341 382/115 |
| 7,229,006 | B2 | 6/2007 | Babbi et al. | |
| 7,292,996 | B2 | 11/2007 | Nobrega et al. | |
| 7,362,869 | B2 | 4/2008 | Landrock | |
| 7,373,331 | B2 | 5/2008 | Yoshinobu | |
| 2002/0025038 | A1 * | 2/2002 | Lambert | H04L 9/083 380/44 |
| 2002/0032616 | A1 | 3/2002 | Suzuki et al. | |
| 2002/0035539 | A1 | 3/2002 | O'Connell | |
| 2002/0052754 | A1 | 5/2002 | Joyce et al. | |
| 2002/0107791 | A1 | 8/2002 | Nobrega et al. | |
| 2002/0143634 | A1 | 10/2002 | Kumar et al. | |
| 2002/0152175 | A1 * | 10/2002 | Armstrong | G06Q 20/382 705/64 |
| 2003/0055738 | A1 * | 3/2003 | Alie | G06Q 20/04 705/26.1 |
| 2003/0119478 | A1 | 6/2003 | Nagy et al. | |
| 2003/0177351 | A1 * | 9/2003 | Skingle | H04L 9/3268 713/156 |
| 2003/0194086 | A1 * | 10/2003 | Lambert | G06F 7/725 380/44 |
| 2003/0195848 | A1 * | 10/2003 | Felger | H04M 15/68 705/40 |
| 2003/0200184 | A1 | 10/2003 | Dominguez et al. | |
| 2005/0069137 | A1 | 3/2005 | Landrock | |
| 2005/0108571 | A1 * | 5/2005 | Lu | G06F 21/34 726/4 |
| 2005/0154898 | A1 * | 7/2005 | Chao | G06F 21/445 713/185 |
| 2005/0263588 | A1 | 12/2005 | Babi et al. | |
| 2007/0106619 | A1 * | 5/2007 | Holdsworth | G06Q 20/04 705/67 |
| 2016/0309331 | A1 * | 10/2016 | Moon | H04W 4/70 |
| 2017/0228732 | A1 * | 8/2017 | Badenhorst | G06Q 20/401 |

FOREIGN PATENT DOCUMENTS

| | | | | |
|---|---|---|---|---|
| JP | | 2002-279195 | 9/2002 | |
| JP | | 2002-304532 | 10/2002 | |
| JP | | 2003-520498 | 7/2003 | |
| WO | | WO 98/45797 | 10/1998 | |
| WO | | WO 01/24087 | 4/2001 | |
| WO | | WO 01/52487 | 7/2001 | |
| WO | | WO 2004/091170 | 10/2004 | |
| WO | | WO 2005001729 | 1/2005 | |
| WO | | WO 2005001729 A2 * | 1/2005 | ............. G06Q 20/04 |
| WO | | WO-2005001729 A2 * | 1/2005 | ............. G06Q 20/04 |

OTHER PUBLICATIONS ("gms-umts.sec.ppt", 2007, Levente Buttyán, 11 pages) (Year: 2007).*
Schneier, "Applied Cryptography Protocols, Algorithms and Source Code in C", Published by John Wiley & Sons, Inc., 1996, pp. 4 and 5 (Year: 1996).*
Schneier, "Applied Cryptography Protocols, Algorithms and Source Code in C", Published by John Wiley & Sons, Inc., 1996, pp. 33 and 34 (Year: 1996).*
Schneier, "Applied Cryptography Protocols, Algorithms and Source Code in C", Published by John Wiley & Sons, Inc., 1996, pp. 47 and 48 (Year: 1996).*
Menezes et al., "Handbook of Applied Cryptography", CRC Press, 1996, p. 499 (Year: 1996).*
Dewan, Global Information Assurance Certification Paper, An Idiots Guide to Public Key Infrastructure, SANS Institute, pp. 8 and 9, 2003 (Year: 2003).*
Dewan, Global Information Assurance Certification Paper, An Idiots Guide to Public Key Infrastructure, SANS Institute, pp. 10-12, 2003 (Year: 2003).*
"RFC 2246—The TLS Protocol Version 1.0", Internet Engineering Task Force, Jan. 1999 (Year: 1999).*
3-D Secure™ Introduction, Visa International Association, Sep. 26, 2002, 19 pages (Year: 2002).*
Agnew, "Secure Electronic Transactions: Overview, Capabilities, and Current Status", A&F Consulting and University of Waterloo, published in Payment Technologies for E-Commerce, 2003, 17 pages (Year: 2003).*
EMVCO 3-D Secure 2.0, Underwriter's Laboratories, 2017, 20 pages (Year: 2017).*
GPayments, "Visa 3-D Secure vs. MasterCard SPA A comparison of online authentication standards", 2002, 37 pages (Year: 2002).*
"Gpayments: Visa 3-D Secure vs. MasterCard SPA—A comparison of online authentication standards", Internet Citation, Mar. 2002, pp. 1-37, XP002690680 (URL:http://www.3mfuture.com/articles_epayments/GPayments_3-D_vs_SPA_Whitepaper.pdf).
European Search Report dated Jul. 3, 2014.
Canadian Office Action dated May 27, 2014.
European Search Report dated Apr. 16, 2010.

* cited by examiner

SYSTEM AND METHOD FOR CONVERSION BETWEEN INTERNET AND NON-INTERNET BASED TRANSACTIONS

This application is a continuation of U.S. patent application Ser. No. 11/340,887, filed on Jan. 27, 2006, which claims priority from U.S. Provisional Application No. 60/647,883, filed Jan. 28, 2005.

BACKGROUND

The present inventive subject matter relates to the art of transaction conversion. It finds particular application in conjunction with conversions between Internet based transactions and non-Internet based transactions, and will be described with particular reference thereto. However, one of ordinary skill in the art will appreciate that it is also amenable to other like applications.

Internet commerce, or e-commerce as it is otherwise known, relates to the buying and selling of products and services between consumers and merchants over the Internet or other like transactional exchanges of information over similar telecommunication networks. The convenience of shopping over the Internet has sparked considerable interest in e-commerce on behalf of both consumers and merchants. Internet sales, or like transactions, have been typically carried out using standard credit cards such as Visa®, MasterCard®, Discover®, American Express®, or the like, or standard debit cards, i.e., check cards or automated teller machine (ATM) cards which directly access funds from an associated deposit account or other bank account.

While widely used for more traditional face-to-face transactions, use of these standard cards in connection with e-commerce presents certain difficulties, including difficulties concerning authentication or positive identification of the cardholder. For example, maintaining consumer confidence in security has become difficult with increased reports of fraud. The resulting apprehension is also fueled by consumer uncertainty of the reputation or integrity of a merchant with whom the consumer is dealing. Questionable security of the consumer's card information or other personal information typically submitted along with a traditional e-commerce transaction (e.g., address, card number, phone number, etc.) serves to increase apprehension even more. Additionally, cardholders, merchants and financial institutions are all concerned about safeguarding against fraudulent or otherwise unauthorized transactions.

Accordingly, various credit card or payment networks have implemented initiatives or programs aimed at safeguarding against fraud. Payment networks (e.g., Visa® and MasterCard®) have implemented various initiatives (e.g., Visa 3-D Secure®, a.k.a. Verified by Visa® (VbV), and MasterCard SecureCode®) to allow for the authentication of a cardholder prior to authorizing a transaction. The benefits to all the parties involved in the transaction have been acknowledged. However, the programs mainly focus on e-commerce conducted over the Internet.

For example, these Internet authentication initiatives work by having a merchant implement a piece of software on their server that will connect a cardholder to their bank for authentication. The cardholder authenticates with the bank by connecting to a server over the Internet that stores authentication credentials for that cardholder, whether it be a password, PKI (Public Key Infrastructure), biometric, or some other credential. The bank then sends authentication data (based on success or failure) back to the merchant to package into an authorization message. Often, this is all carried out over the world-wide-web, e.g., using HTML (Hypertext Markup Language).

However, there is also a desire to authenticate cardholders in other "card-not-present" transactions, i.e., in other than Internet transactions. Particular applications include, e.g., mobile top-up or purchase of air time minutes for prepaid mobile telephones of other mobile devices made with a card, proximity payments using IR (Infrared) or other communications technology to send payment details to an unmanned POS (Point of Sale) device, telephone orders, etc. These types of transactions can originate from many applications such as through an IVR (Interactive Voice Response) system, using SMS (Short Message Service) messaging, using STK (SIM (Subscriber Identity Module) Toolkit), or IR financial messaging. Typically, these other "card-not-present" types of transactions do not enjoy the benefit of cardholder signatures to protect against fraudulent card use. Additionally, they also do not enjoy the benefit of the aforementioned authentication programs, insomuch as those programs are focused on Internet based transactions.

While authentication is desirable in other card-not-present situations, it can be burdensome to develop separate diverse programs for each potential type of transaction. It would be advantageous therefore to be able to employ the aforementioned authentication initiatives for these other types of non-Internet based transactions. The challenge is determining how to best utilize the system elements, methods and/or protocols already in place for the foregoing programs to achieve authentication of the cardholder, being that the cardholder is often not actually on the Internet in these situations.

Accordingly, a new and improved apparatus and/or method for converting transactions between Internet based transactions and non-Internet based transaction is disclosed that overcomes the above-referenced problems and others.

BRIEF DESCRIPTION

In accordance with one exemplary embodiment, a method is provided for completing an authenticated commercial transaction over an internet protocol (IP) network for an account holder engaged in the transaction via a non-IP based telecommunications platform. The method includes: receiving a first message from the account holder via the non-IP based telecommunications platform, the first message triggering authentication of the account holder and being in a first communication format; establishing account information for a payment instrument being used in the transaction based upon content in the first message; generating a second message using a second communication format different from the first format, the second message including the established account information; submitting the second message via the IP network to a network entity such that an authentication document is generated, the authentication document containing an input field; generating a third message using the first format, the third message being submitted to the account holder via the non-IP based telecommunications platform such that the account holder is prompted to enter a security code; receiving a fourth message containing the entered security code from the account holder via the non-IP based telecommunications platform, the fourth message being in the first format; and, accessing the authentication document via the IP network to fill-in the input field of the authentication document with the security code contained in the fourth message.

In accordance with another exemplary embodiment, a transaction conversion system is provided for bridging commercial transactions between a first network and a plurality of diverse second networks that employ communication protocols that are different from a communication protocol employed by the first network. The system includes: an interface operatively connected to the plurality of diverse second networks, the interface provisioned to selectively exchange messages between the transaction conversion system and account holders participating in commercial transactions via the second networks; a network robot operatively connected to the first network, the network robot provisioned to access at least one of documents or network entities via the first network to selectively obtain data therefrom and to selectively enter data therein; and, an application container provisioned to direct operation of the robot and control data flow between the robot and the interface in connection with an associated task being performed by the system.

Numerous advantages and benefits of the inventive subject matter disclosed herein will become apparent to those of ordinary skill in the art upon reading and understanding the present specification.

BRIEF DESCRIPTION OF THE DRAWINGS

The present inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

A system and/or method is proposed to bridge non-Internet based transactions to the Internet to take advantage of authentication programs prescribed by various payment networks for Internet transaction. In this manner, the infrastructure, systems, methods and/or protocols already in place and/or implemented for Internet based transactions can be leveraged to accommodate non-Internet based transactions. Suitably, the system and/or methods are channel agnostic, protocol agnostic and device agnostic. That is to say, the non-Internet based side of the transaction may be carried out from a variety of different types of end user devices, employing a variety of different communications protocols over a variety of different communication platforms or transmission channels.

Figure 1:
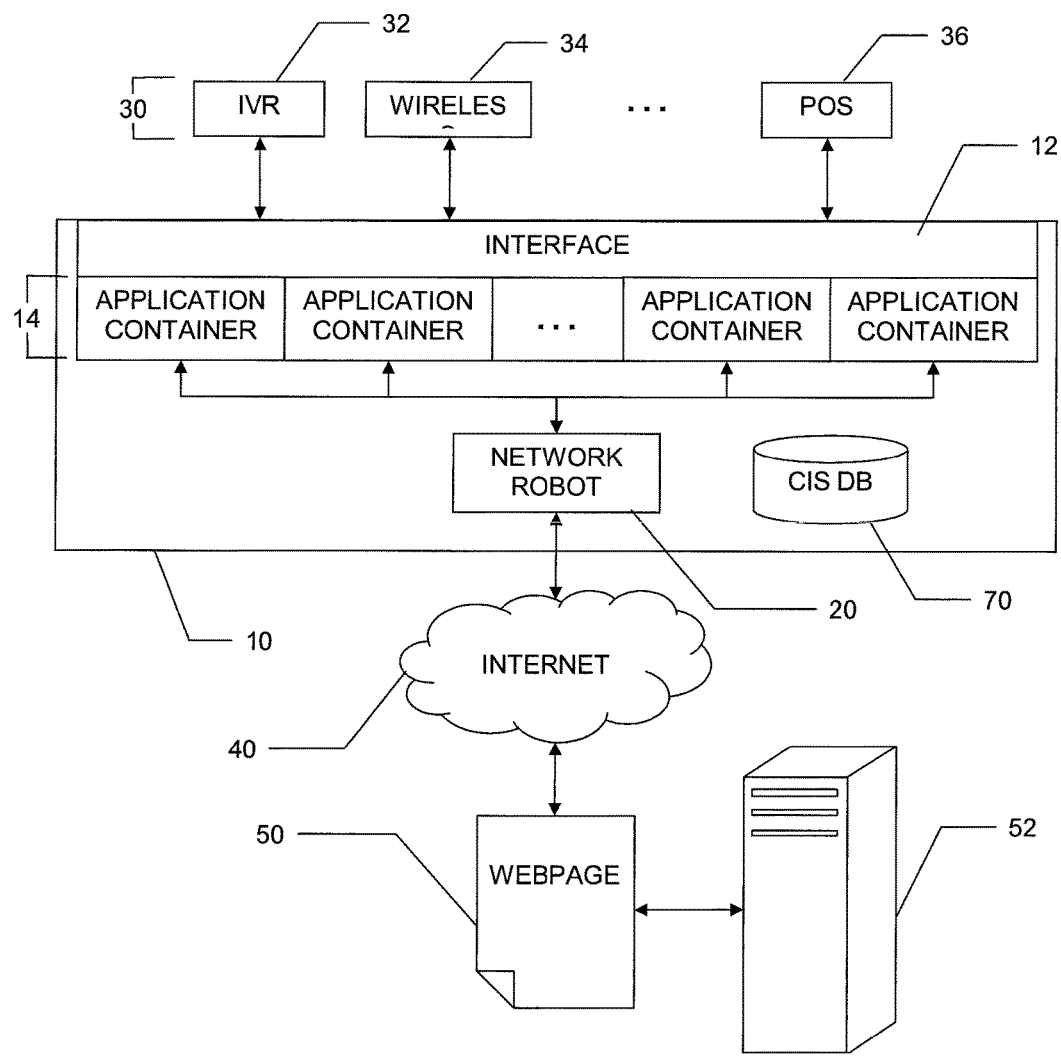
FIG. 1 is a diagrammatic illustration showing a transaction conversion system embodying aspects of the present inventive subject matter.

With reference to FIG. 1, there is illustrated a transaction conversion system 10 that supports conversion of transactions between Internet based transactions and non-Internet based transactions. Suitably, the system 10 includes an interface 12, a plurality of application containers 14 and a network robot 20. Suitably, the system 10 and/or its respective components (e.g., the interface 12, the application containers 14, the network robot 20, etc) are implemented as one or more optionally customizable software programs, applications or other appropriate collection of instructions running on and/or being executed by a server, computer or other appropriate hardware to perform and/or administer the tasks, processes and/or functions associated with the system 10 and/or its components as they are described herein. Optionally, only a single server implements, administers and/or supports the system 10, however, it is to be appreciated that alternately one or more servers may act separately or in combination to function as web servers, application servers, database servers, etc., such that collectively they operate in conjunction with one another to implement, administer and/or support the system 10. In short, the system 10 and/or its components are optionally implemented via any suitable configuration of hardware, software, firmware or combination thereof.

As shown, the interface 12, e.g., is operatively connected to a plurality of diverse types of interactive communications platforms 30 by which the system 10 interacts with the non-Internet based side of the transactions. For example, the platforms optionally include, without limitation:

(i) an interactive voice response (IVR) system 32, which may be any conventional IVR system;

(ii) a wireless network 34 that serves a mobile station (MS) (such as a mobile telephone, a wireless personal digital assistant (PDA), etc.), suitably, the MS engages in the transaction, e.g., via a wireless application protocol (WAP), a subscriber identity module application toolkit (SIM Toolkit or STK), or a short message service (SMS); and/or, (iii) a point of sale (POS) system 36.

Suitably, each container 14 includes a particular program or provisioning that regulates the operation of the robot 20 for a particular task associated with the container 14, and controls data flow between the robot 20 and the interface 12. For example, the network robot 20 is a virtual robot (a.k.a. a "bot"), software agent, or other like program. As illustrated, the network robot 20 is operatively connected the Internet 40 or another like network. Suitably, the robot 20 is programmed or otherwise provisioned to access over the Internet 40 designated documents (e.g., such as a webpage 50 supplied by a server 52) and/or designated network entities (e.g., such as a server or computer at a designated IP address and port) and selectively to obtain information or data therefrom and/or to provide or enter input thereto.

Figure 2:
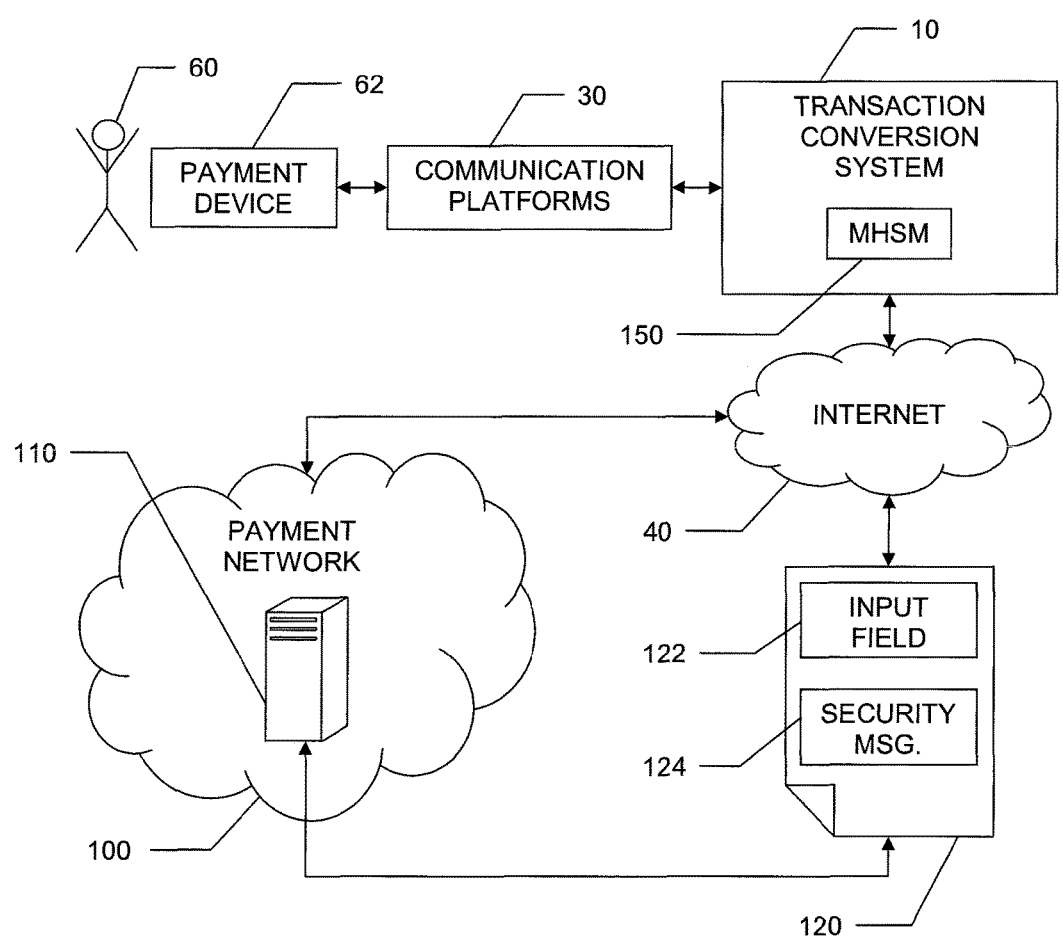
FIG. 2 is a diagrammatic illustration showing a transaction conversion system embodying aspects of the present inventive subject matter operating in conjunction with a payment network.

In one suitable embodiment, the plurality of containers 14 include at least one container designated for cardholder/account holder authenticated transaction processing. With added reference now to FIG. 2, suitably, a customer and/or cardholder or account holder 60 initiates a non-Internet based transaction via one of the interactive communications platforms 30 using a payment device 62. The payment device may be a MS, a landline telephone, a POS terminal or card reader or other like device capable of utilizing any one or more of the foregoing platforms 30.

For example, the cardholder/account holder 60 optionally initiates a telephone order transaction by calling a particular merchant to purchase goods and/or services over the telephone. The selection of goods and/or services is suitably conducted in any customary manner, e.g., via an operator or customer service professional or via an IVR system (such as the IVR system 32), and a purchase amount is established. Optionally, the IVR system 32 is operated or managed by the merchant or some third party. If not already connected thereto, the cardholder is then transferred to the IVR system 32 to complete the transaction. For example, using dual-tone multi-frequency (DTMF) digits, voice recognition or the like, the cardholder enters and/or the IVR system 32 otherwise obtains the relevant account information for the payment instrument or card that is to be used for payment. This information optionally includes the name on the card, the card number or primary account number (PAN) and/or the expiration date. Similarly, a cardholder may also shop and/or selectively make payments via any of the other interactive payment platforms 30 using a payment device appropriate for the respective platform. For example, a POS terminal may optionally be used to initiate the transaction. The POS terminal may use a card reader, infrared (IR), Bluetooth or other communications technology to obtain the relevant information: (i) from a payment device provisioned with the account information (e.g., an appropriately equipped MS, PDA, etc.); and/or (ii) directly from the payment instrument itself (e.g., a credit card, debit card, or other payment instrument).

Suitably, a payment message containing the relevant card data is sent via the communications platform used to the transaction conversion system 10. Optionally, the platform formats the payment message into an appropriate form, e.g., hypertext mark-up language (HTML), extensible mark-up language (XML), standard generalized mark-up language (SGML) or another suitable format that is readable or otherwise recognized by the transaction conversion system 10. Alternately, the platform transmits the message to the transaction conversion system 10 in a native format which is then translated by the interface 12 into the appropriate form. This transmission is optionally sent over a dedicated line and/or using a secure channel, e.g., secure sockets layer (SSL), Internet Protocol security (IPsec), or the like.

In an alternate embodiment, the card information is not entered by the customer 60 or otherwise submitted from the payment device 62, and hence, not contained in the payment message. Rather, the card information is maintained in a customer information system (CIS) database (DB) 70 (see FIG. 1) accessible by the system 10. The card information in the CIS DB 60 is cross referenced to particular cardholders via a mobile subscriber identity number (MSIDN) or telephone number of one or more payment devices, e.g., which belong to the cardholders. Accordingly, when a cardholder is using a payment device (be it a MS or landline telephone) to initiate a transaction, the payment message is populated with the MSIDN or telephone number for that device. For example, this information is automatically obtained via caller ID or a similar function, or alternately, may be entered or otherwise submitted manually, e.g., if the customer is not using their own device. In response to the received MSIDN or telephone number, the transaction conversion system 10 extracts the corresponding card information from the CIS DB 70.

Having established the relevant card and/or account data, the information (e.g., including the PAN) is ultimately submitted over the Internet 40 to a conventional payment network 100 (e.g., Visa, MasterCard, PayPal, etc.) for authentication of the cardholder/account holder in accordance with a standard Internet based transaction. In response, the payment network 100, for example via an authentication server 110 (similar to the server 52 shown in FIG. 1) opens a pop-up window containing an authentication webpage 120 (similar to the webpage 50 shown in FIG. 1). Suitably, the webpage 120 includes an input field 122 for inputting an otherwise secret personal identification number (PIN), password or the like, and an optional security message 124. The security message 124 is an otherwise secret message set by the cardholder (or otherwise determined) to identify that in fact the requesting webpage 120 originates from the payment network 100.

Suitably, the location of the webpage 120 is identified by a uniform resource locator (URL), Internet address or other like location identifier, and it is optionally formatted in HTML, XML, SGML or another suitable format. The location identifier is provided to the robot 20 to thereby direct the robot 20 to the webpage 120. The robot 20 captures and/or parses the webpage 120 thereby identifying the input field 122 and the optional security message 124 (if present). For example, the container regulating this operation optionally specifies one or more particular items of information and/or input fields to be located in the webpage 120. Accordingly, the robot 20 searches or otherwise mines the accessed webpage 120 for the specified items/fields and returns the same. Suitably, the items/fields of interest in the webpage 120 are marked by appropriate tags, and these tags are specified in the container as identifying the item/field of interest. Accordingly, the robot 20 scans or parses the accessed webpage 120 searching for the tags. When a tag specified in the container is encountered in the webpage 120, the robot 20 captures the associated tagged data, information or field from the webpage 120 and returns the same. In this manner, the data and/or input fields of interest are obtained by the robot 20.

In response to identifying the items and/or input fields of interest, the transaction conversion system 10 generates an authentication message that is transmitted via the operative communications platform back to the payment device 62 being used by the cardholder 60. For example, the authentication message includes the optional security message 124 (if present) and a request or prompt for input into the input field 122. Suitably, the system 10 formats the authentication message in a format readable and/or otherwise recognizable by the communications platform being employed, and in turn, the authentication message is translated by the platform into a form appropriate for the payment device being employed.

For example, the authentication message generated by the system 10 is formatted in HTML, XML, SGML or another suitable format, and transmitted to the IVR system 32. The IVR system 32, in turn, converts the authentication message into a voice message, e.g., using a conventional text-to-speech converter. Accordingly, the optional security message 124 (if present) is played or audiblized over the payment device (e.g., a telephone) to the cardholder 60, followed by a prompt to enter their PIN or password or other security credential, e.g., via DTMF digits or via voice if the IVR system 32 includes a voice recognition feature. Of course, if another platform is being utilized, the other platform would perform a similar conversion as appropriate for the given case. For example, in the case of the wireless platform 34 and/or payment device 62 supporting SMS, the authentication message may ultimately be converted to an SMS message that is delivered to the payment device 62 in a corresponding fashion. Alternately, the platform merely transmits the authentication message in a native format readable and/or otherwise recognizable by the payment device 62, the interface 12 of the transaction conversion system 10 having already translated it into the appropriate form.

As desired, in response to receipt of the authentication message, the cardholder 60 confirms that any delivered security message is accurate, and assuming it is correct (i.e., that it matches the one arranged with the payment network 100), they enter or otherwise submit their security credentials (e.g., a PIN, a password, a biometric identifier, etc.) using the payment device 62, e.g., via a reply SMS message, DTMF digits, voice, etc., as the case may be for the payment device and/or platform being utilized. The PIN or password or other security credential is then transmitted via the platform to the transaction conversion system 10, undergoing translation and/or conversion along the way as appropriate, i.e., the opposite or reverse of the authentication message. Suitably, in response to the system 10 receiving the input security credentials, the robot 20 is directed to populate the webpage 120 with the security credentials (e.g., by entering or otherwise inserting the input security credentials into the corresponding identified input field 122) and post the webpage 120 back to the server 110, thereby prompting the payment network to perform authentication based on the input security credentials and generate an authentication result. Suitably, the authentication result is ultimately returned to the system 10, e.g., again via a webpage posted by the server 110 and accessed by the robot 20.

Optionally, to maintain security of the cardholder's security credentials or other data during various portions of transmission from one node to the next, the system 10 is equipped with a modified hardware security module (MHSM) 150 that supports a standard public-key or asymmetric encryption technique. Unlike a conventional HSM, the MHSM 150 is provisioned with its own public-private key pair and is equipped or otherwise provisioned to initiate or engage in secure Internet sessions whereby a public session key is obtained by the MHSM 150 and used to re-encrypt data.

For example, the PIN or other security credentials transmitted to the system 10 via one of the platforms 30 is optionally encrypted with the MHSM's public key. Suitably, the MHSM's public key is forwarded to the payment device 62 (or a suitable node within the communications platform being used) along with the prompt or request for PIN entry. It is therefore available to the public key receiving device or node which uses the same to encrypt the PIN being transmitted to the system 10. Having been received by the system 10, the PIN encrypted with the MHSM's public key is routed to the MHSM 150. Suitably, the MHSM 150 originates an SSL or other secure session over the Internet 40 with the server 110. During the SSL handshake or session setup, the MHSM 150 obtains a public session key from the server 110. The MHSM 150 decrypts the PIN with its private key (i.e., the MHSM private key corresponding to the MHSM public key), and re-encrypts the PIN using the public session key obtained from the server 110. The re-encrypted PIN is then transmitted over the Internet 40 to the server 110 which is provisioned with the corresponding private session key that is used to decrypt the PIN. As can be appreciated in light of the forgoing example, the un-encrypted PIN is only observable within the MHSM 150, which, like a conventional HSM, is safeguarded against unauthorized intrusion Of course, other sensitive data and/or information (i.e., other than just the PIN) may likewise be protected. Of course, optionally, the PIN delivered to the MHSM 150 may not be encrypted, in which case the MHSM 150 does not decrypt the PIN, rather it just encrypts the PIN in accordance with the secure connection set up between itself and the server 110.

By generating an SSL session or other similar secure session from within MHSM 150, the protection of any sensitive data, such as, PINs, card numbers, etc., can be enhanced. Moreover, by the establishing end-to-end encryption using the MHSM 150, the sensitive information is not compromised even to the systems administrator of the platform that the service is running on. As with a conventional HSM, the MHSM 150 protects against any memory, hardware and software based attacks attempting to gain access to the sensitive information.

Suitably, the MHSM 150 is otherwise a conventional HSM with a software module placed within the HSM's secure memory area. This software module operates within the MHSM 150 to achieve the following functions: (i) receive an encrypted piece of sensitive data; (ii) decrypt the sensitive data using the appropriate private key; (iii) store the decrypted sensitive data within the FIPS (Federal Information Processing Standards) regulated memory of the MHSM 150; (iv) initiate a new SSL session with a target server (e.g., server 110); (v) establish intermediate session encryption keys based on the SSL interaction between the software module and the target server, the intermediate session keys being stored within the FIPS regulated memory of the MHSM 150; and, (vi) encrypt the data from step (iii) with the session encryption keys and communicate the encrypted data to the target server.

Figure 3:
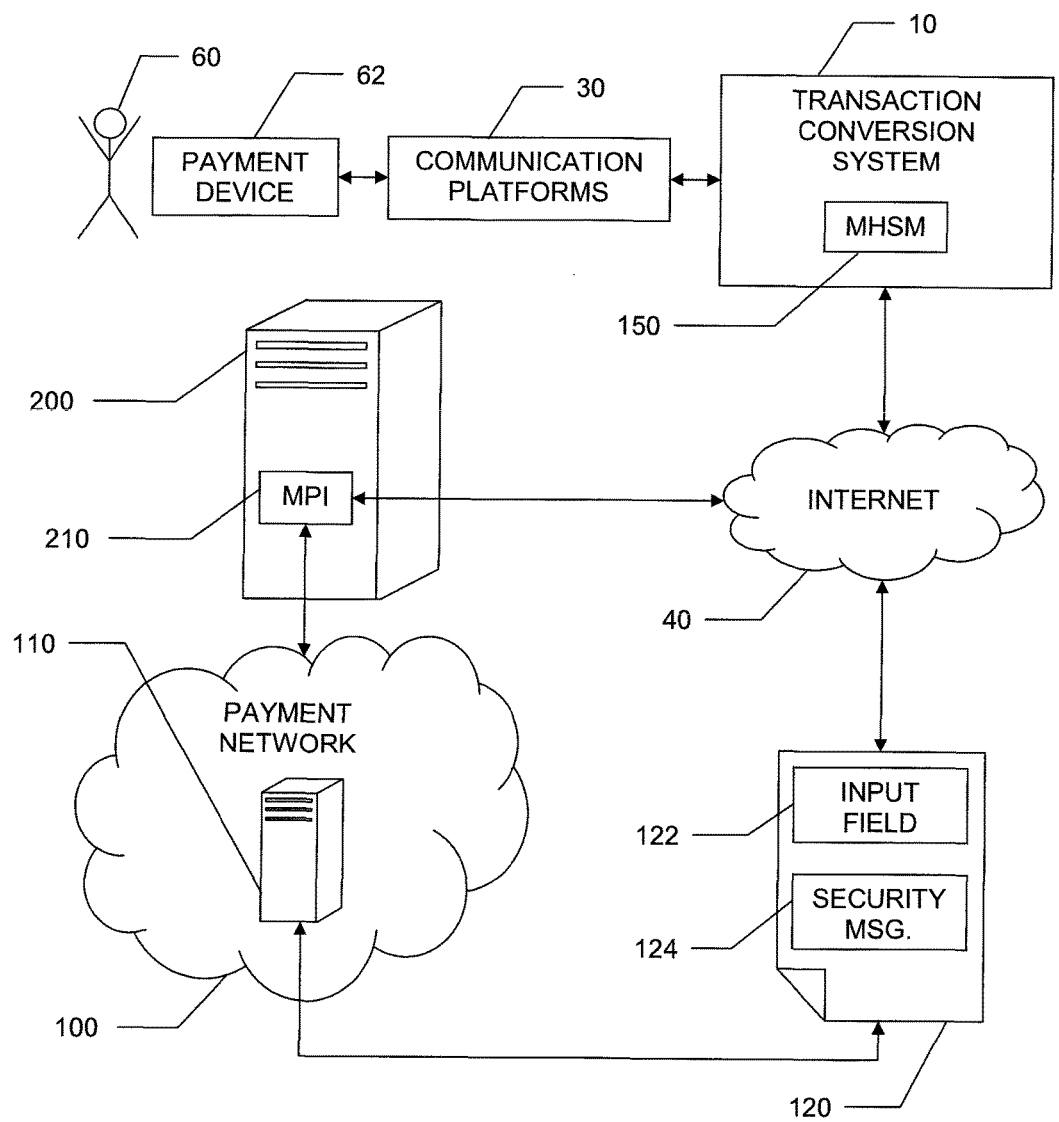
FIG. 3 is a diagrammatic illustration showing a transaction conversion system embodying aspects of the present inventive subject matter operating in conjunction with a merchant server.

With reference to FIG. 3, suitably, the merchant in the particular exemplary transaction maintains a server 200 operatively connected to the Internet 40 so as to conduct Internet based transaction or electronic commerce (i.e., e-commerce). For example, the merchant server 200 includes a plug-in 210 that interacts with the payment network 100 in the usual manner for authenticating cardholders conducting Internet based transactions and/or authorizing the transactions. Suitably, having obtained the aforementioned authentication result or determination (e.g., from the server 110), the system 10 forwards the same over the Internet 40 to the merchant server 200 in an authentication result message, optionally, along with the other relevant transaction details, e.g., payment amount, account or card information, etc. The merchant server 200 via plug-in 210 may then submit this information to the payment network 100 for authorization in the customary manner in which the payment network 100 authorizes Internet based transactions. Alternately, the system 10 formats and submits the relevant information directly to the payment network 100 for authorization.

Optionally, the authentication processing is also carried out via the merchant server 200. For example, having established and/or obtained the relevant card data, transaction information and/or the PIN, this information may be submitted by the system 10 over the Internet 40 to the merchant server 200. More specifically, the robot 20 optionally retrieves one or more webpages provided by the server 200 and populates the relevant input fields with the appropriate data. In this manner, the merchant server 200 obtains the transaction data and/or payment information from a non-Internet based transaction, and may use the plug-in 210 to access the payment network 100 and process the non-Internet based transaction in the same manner as if it were an Internet based transaction.

Figure 4:
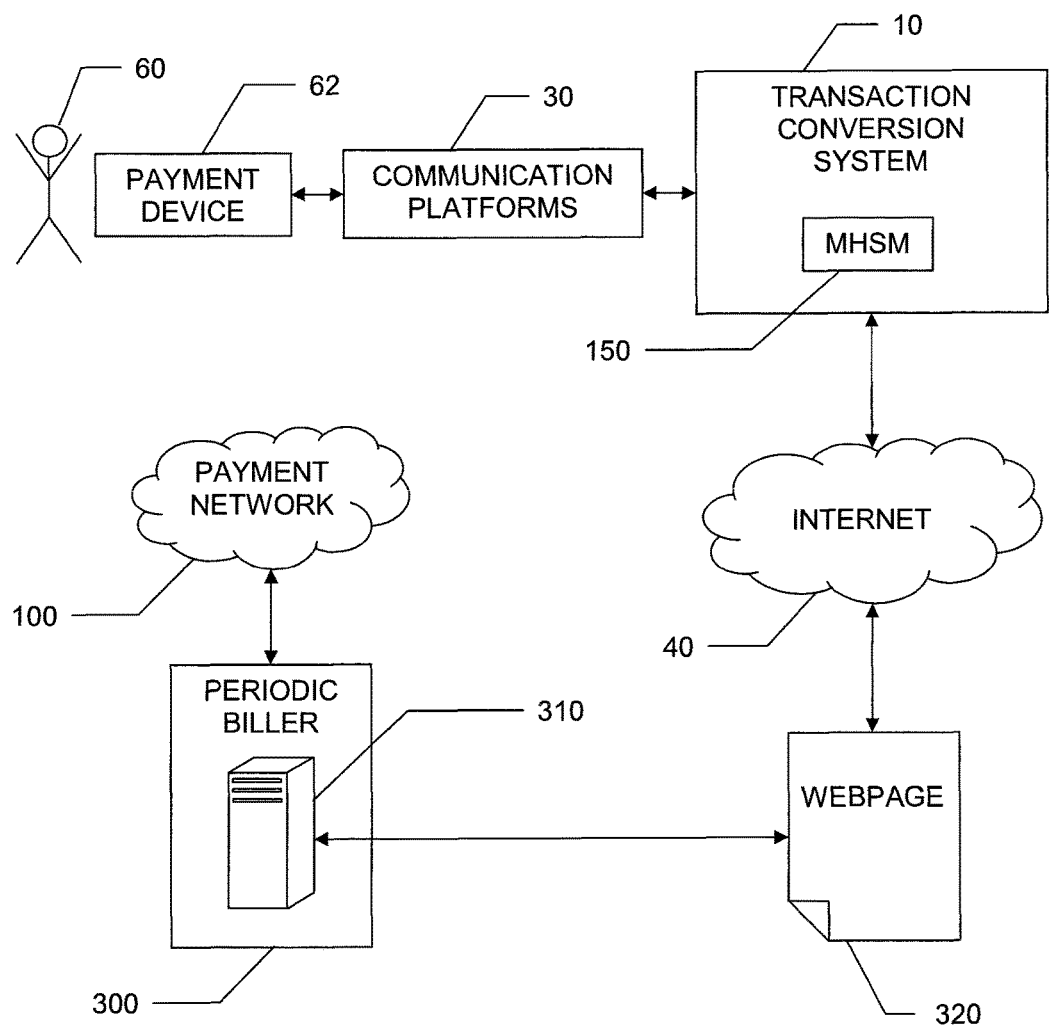
FIG. 4 is a diagrammatic illustration showing a transaction conversion system embodying aspects of the present inventive subject matter operating in conjunction with a periodic biller.

With reference to FIG. 4, in another suitable embodiment, the plurality of containers 14 includes at least one container designed for automatic bill presentment and optional payment. For example, the cardholder 60 is optionally a customer that subscribes to a service or otherwise obtains goods from a vendor (i.e., a periodic biller 300) that provides periodic electronic bills via server 310. Optionally, the cardholder/customer 60 registers with the system 10 for access to the automatic bill presentment feature. During registration, the cardholder/customer provides the appropriate customer account information for the account maintained by the periodic biller 300. This may include, e.g., login information (account number, password, etc.) used to access the customer account via server 310. Suitably, this information may also be maintained in the CIS DB 70.

Suitably, the automatic bill presentment container contains a uniform resource locator (URL), Internet address or other like location identifier. The location identifier is provided to the robot 20 to thereby direct the robot 20 to a webpage 320 having a customer's electronic bill presented thereon. Optionally, the URL directs the robot 20 to a login page provided by the server 310. Using the login information obtained during the registration process, the robot 20 fills-in the appropriate input fields and posts the page back to the server 310, prompting the server 310 to provide the webpage 320. Optionally, the container also includes a schedule that determines when the robot 20 fetches the electronic bills. The schedule (along with the login page URL and/or other location identifier) may be pre-arranged with various different vendors and/or customers, e.g., depending on their particular billing cycles and the vendors' locations on the Internet 40. The billing cycle and/or location information is optionally obtained from the customer during the registration process, or may be obtained from the vendors.

For example, the electronic bill is optionally formatted in hypertext mark-up language (HTML), extensible mark-up language (XML), standard generalized mark-up language (SGML) or another suitable format. The container also specifies one or more particular items of information to be obtained from the webpage 320. Accordingly, the robot 20 searches or otherwise mines the accessed webpage for the specified items and returns the data, e.g., their respective values. Suitably, the items of interest in the electronic bill are marked by appropriate tags. These tags are specified in the container. Accordingly, the robot 20 scans the accessed webpage searching for the tags. When a specified tag is encountered, the robot 20 captures the associated tagged data, information or value and returns the same. In this manner, the data of interest is obtained from the customer's electronic bill. The data of interest may include, for example, an amount due, a due date, etc. To complete presentment of the bill to the customer, the bill is formatted as appropriate for the customer's receiving platform, and the bill including the obtained data is sent over the customer's receiving platform via the interface 12 for delivery to the customer's end user device 62. Optionally, at the time of registration, the cardholder/customer 60 specifies the device 62 and/or particular communications platform 30, to which and/or over which, the automatic bill presentment is to be made. As before, suitably, the system 10 (e.g., via interface 12) performs any appropriate translation of the electronic bill accessed from the webpage 320 and/or formatting of the data obtained therefrom into a format or form supported by the communications platform 30 over which it is being sent and recognizable/usable by the device 62 to which it is being delivered. In this manner, an Internet based (i.e., HTML, XML, SGML, etc.) electronic bill, is converted and present to a customer in a non-Internet based fashion (e.g., via an IVR system, SMS, etc.).

Suitably, the customer/cardholder 60 is also provided the opportunity to pay the presented bill. The webpage 320 may include one or more input fields (e.g., for entering payment instructions and/or payment information) that are obtained by the robot 20. Accordingly, the bill presented by the system 10 to the device 62 may optionally prompt the user 60 to provide the input for the fields or otherwise obtain the information from the device 62 automatically. In response to the entered or otherwise obtained information, the robot 20 populates the input fields and posts the webpage 320 back to the server 310 thereby executing payment. Again, as before, suitably, the system 10 (e.g., via interface 12) performs any appropriate translation of the response from the device 62 and/or formatting of the data obtained therefrom into a format or form suitable for input into the webpage 320. The periodic biller 300, then may forward this information on to the payment network 100 in the usual manner.

Optionally, the webpage 320 may include a single input field simply asking if the customer desires to pay the bill. For example, the customer 60 and vendor 300 may have a prearranged payment method, e.g., the customer 60 may have previously provided payment instrument details and/or payment instructions and authorized the vendor 300 to collect payment via that instrument and/or in accordance with the prearranged instructions. Additionally, the webpage 320 may also include an input field asking the customer how much of the bill they wish to pay, again optionally using the prearranged method. In this manner, the customer may elect to pay all of the bill at once or some portion of it.

Alternately, the customer and vendor may not have agreed upon a prearranged payment method. Accordingly, payment may be processed according to the previously described cardholder authenticated transaction processing. The periodic biller 300 in this case is simply acts as another merchant maintaining a server 310 (similar to server 200) operatively connected to the Internet 40 for conducting Internet transactions. Optionally, at the time of registration, the customer/cardholder 60 provides the system 10 with the card data or payment information to be used for one or more particular vendors or periodic billers 300. Suitably, this information is maintained in the CIS DB 70. The system optionally uses this information to automatically provided payment details to the periodic biller 300 when an electronic bill is fetched. Suitably, upon completion of a payment, a confirmation of the same is retrieved by the system 10 from the periodic biller 300 and returned to the customer 60.

In a particular exemplary embodiment, the system 10 also includes a container for regulating the top-up or purchase of mobile air time minutes from a wireless telecommunications service provider for a mobile telephone or other MS. Suitably, the payment device 62 is the MS for which the minutes are being purchased, and the communications platform 30 being used is the wireless network 34 serving the MS. For example, via WAP, SIM Toolkit, SMS, etc., supported on the MS, the user 60 sends a message over the wireless network 34 to the wireless service provider indicating the desire to purchase more air time minutes for the MS. This message is in turn routed to the system 10. The system 10 then acts to obtain payer authentication and/or payment authorization accordingly. Suitably, the payment or card information is maintained in the CIS DB 70 accessible by the system 10. The card information in the CIS DB 60 is cross referenced to the MSIDN of the MS for which air time minutes are being purchase. Accordingly, when the MS is used to initiate the top-up transaction, the top-up initiation message is populated with the MSIDN that device. For example, this information is automatically obtained via caller ID or a similar function. In response to the received MSIDN, the transaction conversion system 10 extracts the corresponding card information from the CIS DB 70. Using the extracted information, the system 10 then may obtain authentication and/or authorization in its normal manner as previously described. Results from the authentication and/or authorization are then returned from the system 10 to the wireless service provider which may credit air time to the MS accordingly.

Optionally, in accordance with a more generic embodiment, one of the application containers 14 is used to conduct relatively simple payments. For example, the system 10 receives instructions from an account holder via the interface 12 to make a payment. Accordingly, the robot 20 submits corresponding account information over the network 40 to a designated location in response to the received instructions. Suitably, the system 10 receives confirmation of the payment over the network 40 and relays the confirmation to the account holder via the interface 12.

In connection with the particular exemplary embodiments presented herein, certain structural and/or function features are described as being incorporated in particular embodiments. It is to be appreciated that different aspects of the exemplary embodiments may be selectively employed as appropriate to achieve other alternate embodiments suited for desired applications, the other alternate embodiments thereby realizing the respective advantages of the aspects incorporated therein.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to exemplary embodiments. Obviously, modifications and alterations will occur to others upon reading and understanding the present specification. It is intended that the inventive subject matter be construed as including all such modifications and alterations insofar as they come within the scope of the appended claims or the equivalents thereof.

The invention claimed is:

1. A transaction conversion system that bridges commercial transactions between a first network and a plurality of diverse second networks that employ communication protocols that are different from a communication protocol employed by the first network, wherein the commercial transactions are performed according to authenticated payment initiatives, the system comprising:
  an interface server operatively connected to the plurality of diverse second networks, the interface server configured to selectively exchange messages between one or more application container servers of the transaction conversion system and account holders participating in commercial transactions via the plurality of diverse second networks;
  the one or more application container servers configured to establish account information for a payment instrument being used in a transaction of the commercial transactions, wherein the account information includes an account holder name and a card number associated with the payment instrument being used in the transaction, and wherein the one or more application container servers are configured to establish the account information by:
    obtaining a telephone number associated with an end user device; and
    obtaining the account information from a database in response to the obtained telephone number; and
  a hardware security module (HSM) including a corresponding pair of private and public HSM keys, the HSM configured to:
    receive data encrypted with the public HSM key, the public HSM key distributed publicly;
    decrypt the received data with the private HSM key;
    initiate a secure session over the first network with a targeted network entity to obtain a public session key; and
    re-encrypt data communicated from the HSM to the target network entity via the secure session using the public session key.

2. The transaction conversion system of claim 1, further comprising:
  a network robot server operatively connected to the first network, the network robot server configured to:
    access one or more authentication documents and one or more network entities via the first network to selectively obtain data therefrom and to selectively enter data therein; and
    simulate the account holders on the first network, wherein the one or more authentication documents are configured for direct interaction with the account holders; and,
  wherein the one or more application container servers are configured to direct operation of the network robot server, and control data flow between the network robot server and the interface server, while performing a plurality of tasks, the plurality of tasks including:
    receiving a payment message for a transaction between a first party and a second party, the transaction message received from the first party and received over the second networks through the interface server;
    submitting the established account information to a network entity different than the second party over the first network to generate an authentication document, the submitting independent of the second party and the authentication document including an input field;
    receiving a security credential from the first party over the second networks through the interface server; and,
    entering the received security credential into the input field of the generated authentication document over the first network through the network robot server.

3. The transaction conversion system of claim 2, wherein the plurality of tasks further include:
  receiving instructions from an account holder via the interface server to make a payment;
  submitting account information over the first network with the network robot server to a designated location in response to the instructions;
  receiving confirmation of the payment over the first network; and,
  relaying the confirmation to the account holder via the interface server.

4. The transaction conversion system of claim 1, wherein the plurality of diverse second networks includes a wireless telecommunications network, an interactive voice response system and a point-of-sale system.

5. The transaction conversion system of claim 4, wherein the first network is the Internet.

6. The transaction conversion system of claim 2, wherein the network robot server is configured to parse the one or more authentication documents.

7. The transaction conversion system of claim 2, wherein an authentication document of the one or more authentication documents includes a security message, the security message uniquely identifying the source of the authentication document, and wherein the plurality of tasks further include:
prompting the first user to enter the security credential, wherein the prompt includes the security message and wherein the security message is perceivable to the account holder prior to the account holder entering the security code.

8. A method of bridging commercial transactions between a first network and a plurality of diverse second networks, wherein the first network and the plurality of diverse second networks employ different communication protocols, the method comprising:
with an interface server operatively connected to the plurality of diverse second networks, selectively exchange messages between one or more application container servers and account holders participating in commercial transactions via the plurality of diverse second networks;
with the one or more application container servers, establish account information for a payment instrument being used in a transaction of the commercial transactions, wherein the account information includes an account holder name and a card number associated with the payment instrument being used in the transaction, and wherein the account information is established by:
obtaining a telephone number associated with an end user device; and,
obtaining the account information from a database in response to the obtained telephone number; and
with a hardware security module (HSM) including a corresponding pair of private and public HSM keys:
receive data encrypted with the public HSM key, the public HSM key distributed publicly;
decrypt the received data with the private HSM key;
initiate a secure session over the first network with a targeted network entity to obtain a public session key; and
re-encrypt data communicated from the HSM to the target network entity via the secure session using the public session key.

9. The method of claim 8, further comprising:
with a network robot server operatively connected to the first network:
access one or more authentication documents and one or more network entities via the first network to selectively obtain data therefrom and to selectively enter data therein; and
simulate the account holders on the first network, wherein the one or more authentication documents are configured for direct interaction with the account holders; and,
with the one or more application container servers, direct operation of the network robot server, and control data flow between the network robot server and the interface server, while performing a plurality of tasks, the plurality of tasks including:
receiving a payment message for a transaction between a first party and a second party, the transaction message received from the first party and received over the second networks through the interface server;
establishing account information of the first party for a payment instrument being used in the transaction based upon the received payment message;
submitting the established account information to a network entity different than the second party over the first network to generate an authentication document, the submitting independent of the second party and the authentication document including an input field;
receiving a security credential from the first party over the second networks through the interface server; and,
entering the received security credential into the input field of the generated authentication document over the first network through the network robot server.

10. The method of claim 9, wherein the plurality of tasks further include:
receiving instructions from an account holder via the interface server to make a payment;
submitting account information over the first network with the network robot server to a designated location in response to the instructions;
receiving confirmation of the payment over the first network; and,
relaying the confirmation to the account holder via the interface server.

11. The method of claim 8, wherein the plurality of diverse second networks includes a wireless telecommunications network, an interactive voice response system and a point-of-sale system.

12. The method of claim 11, wherein the first network is the Internet.

13. The method of claim 9, further comprising:
with the network robot server, parsing the one or more authentication documents.

14. The method of claim 8, wherein a plurality of: 1) the interface server; 2) a network robot server; and 3) at least one of the one or more application container servers are the same server.

15. The method of claim 9, wherein an authentication document of the one or more authentication documents includes a security message, the security message uniquely identifying the source of the authentication document, and wherein the plurality of tasks further include:
prompting the first user to enter the security credential, wherein the prompt includes the security message and wherein the security message is perceivable to the account holder prior to the account holder entering the security code.

16. A transaction conversion system that bridges commercial transactions between a first network and a plurality of diverse second networks that employ communication protocols that are different from a communication protocol employed by the first network, wherein the commercial transactions are performed according to authenticated payment initiatives, the system comprising:
an interface server operatively connected to the plurality of diverse second networks, the interface server configured to selectively exchange messages between one or more application container servers of the transaction conversion system and account holders participating in commercial transactions via the plurality of diverse second networks;

the one or more application container servers configured to establish account information for a payment instrument being used in a transaction of the commercial transactions, wherein the account information includes an account holder name and a card number associated with the payment instrument being used in the transaction, and wherein the account information is established by:
obtaining a mobile subscriber identity number (MSIDN) associated with an end user device; and,
obtaining the account information from a database in response to the obtained MSIDN; and a hardware security module (HSM) including a corresponding pair of private and public HSM keys, the HSM configured to:
receive data encrypted with the public HSM key, the public HSM key distributed publicly;
decrypt the received data with the private HSM key;
initiate a secure session over the first network with a targeted network entity to obtain a public session key; and
re-encrypt data communicated from the HSM to the target network entity via the secure session using the public session key.

\* \* \* \* \*